United States Patent Office 3,450,913
Patented June 17, 1969

3,450,913
INTERDIGITATED ROTOR ARRANGEMENT FOR ALTERNATOR
Alfred Dickens Baker, Solihull, England, and Maurice Albert Henry Howes, La Grange, Ill., assignors to Joseph Lucas (Industries), Limited, Birmingham, England
Filed Dec. 30, 1966, Ser. No. 606,106
Int. Cl. H02k 9/02, 1/22
U.S. Cl. 310—159                         2 Claims

ABSTRACT OF THE DISCLOSURE

In an interdigitated rotor for an alternator, the fingers of the rotor do not extend axially as is the usual practice, but are inclined to the axis of the rotor so that the rotor draws air through the casing of the alternator.

---

This invention relates to alternators of the kind including a casing carrying a stator and associated windings, the casing having rotatable therein an interdigitated rotor carrying the field winding of the alternator.

According to the invention in an alternator of the kind specified the fingers of the rotor are shaped to draw air through the casing as the rotor is rotated.

Figure 1:
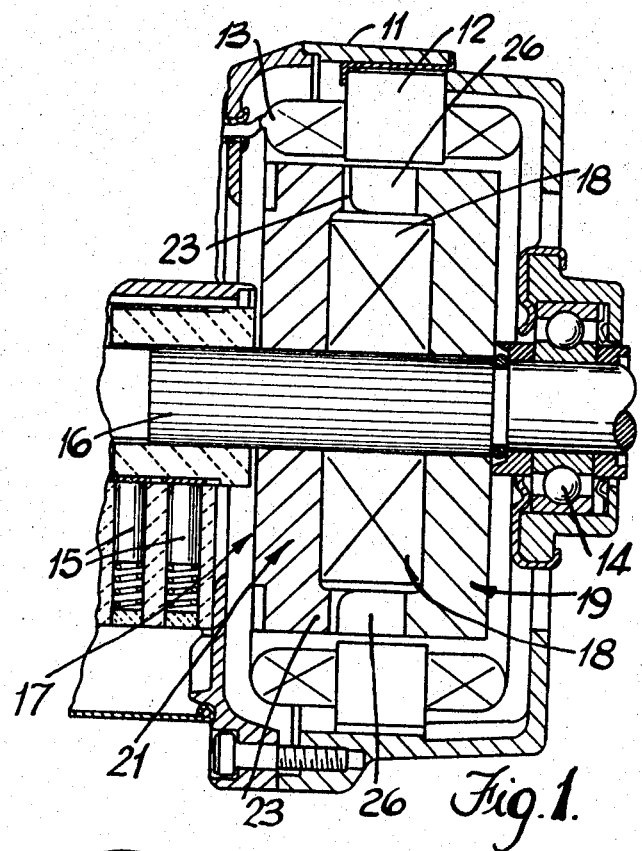

One example of the invention is illustrated in the accompanying drawings wherein FIGURE 1 is a fragmentary sectional view of an alternator for use in a road vehicle.

Figure 2:
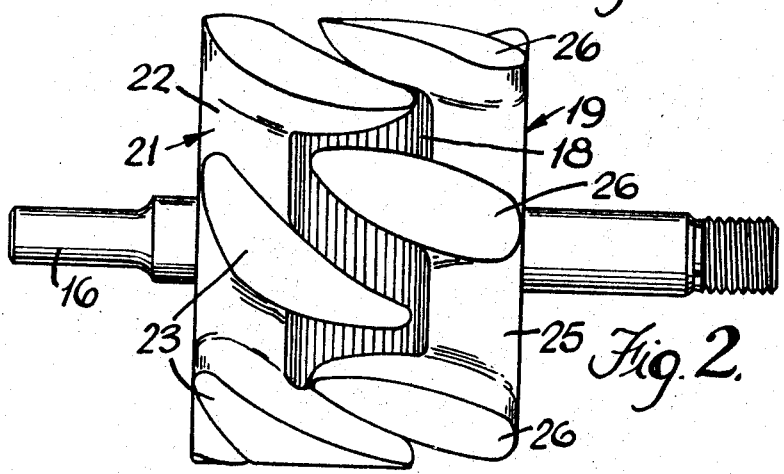
Figure 3:
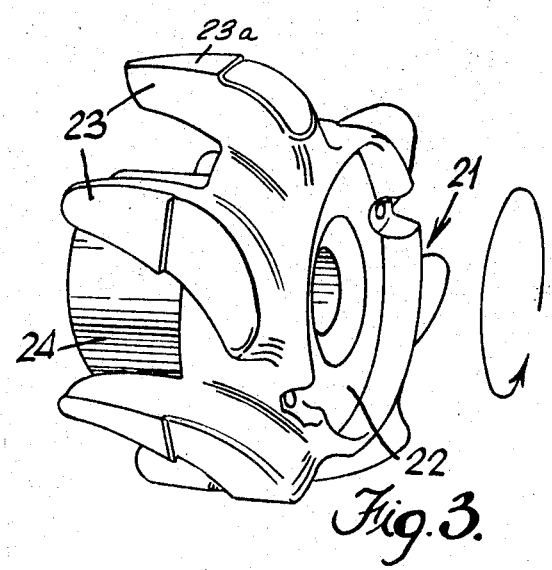
Figure 4:
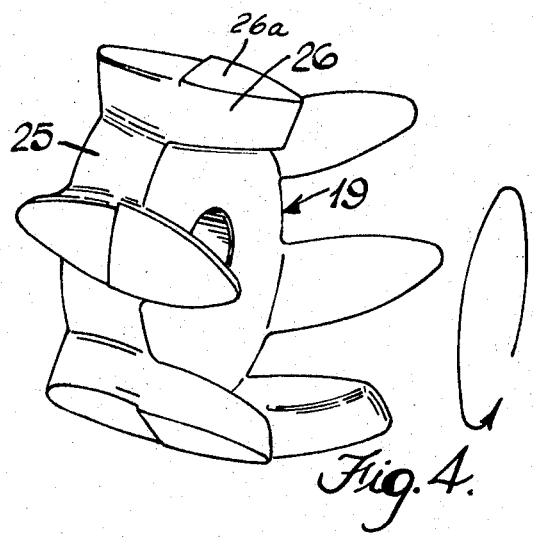

FIGURE 2 is a side elevational view of the rotor of the alternator shown in FIGURE 1, and FIGURES 3 and 4 are perspective views respectively of parts of a modification of the rotor shown in FIGURE 2.

Referring first to FIGURE 1, the alternator includes a casing 11 which carries the stator 12 and associated stator windings 13 of the alternator, the casing further providing bearings 14 for a shaft 16 which is rotated by the engine of the vehicle with which the alternator is associated. The alternator further includes an interdigitated rotor 17 having a splined connection with the shaft 16, the rotor 17 carrying the field winding 18 of the alternator. Current is supplied to the winding 18 by way of brushes 15, the output from the alternator being regulated by a voltage regulator (not shown) controlling the current flow in the winding 18. The output from the windings 13 is rectified to provide the output from the alternator.

Referring now to the remaining drawings the rotor 17 is of two part construction having front and rear members 19, 21 respectively, the members 19, 21 both having a splined connection with the shaft 16. The rear member 21 includes an annular disc 22 having spaced around the periphery thereof a plurality of integral fingers 23. Also integral with the disc 22 and centrally disposed thereon is an axially extending hollow stub 24 upon which the winding 18 is supported. The member 19 comprises an annular disc 25 having spaced around the periphery thereof a plurality of integral fingers 26 equal in number to the fingers 23. The arrangement is such that when the members 19, 21 are assembled on the shaft 16 the fingers 23, 26 will be interdigitated and the winding 18 will be trapped in the annular space defined between the discs 22, 25, the stub 24 and the fingers 23, 26. The members 19, 21 are machined so that when the rotor is assembled the outermost surfaces of the fingers 23, 26 constitute parts of the surface of an imaginary cylinder co-axial with the shaft 16.

In prior rotor constructions the fingers 23 of the rotor extend axially with respect to the rotor and so do not draw air through the casing of the alternator. However, in the present construction the fingers are each inclined with respect to an axially extending line on the surface of the imaginary cylinder generated by rotation of the rotor and therefore they draw air through the alternator casing when the rotor is rotated. In the preferred embodiment the fingers are also curved as shown in FIGURES 2 and 3 to increase the rate at which air is drawn through the casing. The shape of the fingers 26 is so chosen that they fit between the fingers 23 when the rotor is assembled and complete the magnetic circuit.

In the modified rotor shown in FIGURES 3 and 4 the fingers of both of the parts 19, 21 are formed with raised portions 23a, 26a respectively. Only the portions 23a, 26a need be machined in use and thus the amount of machining required by the rotor in FIGURES 3 and 4 is reduced as compared with that required by the rotor in FIGURE 2 wherein the whole of the outer surfaces of the fingers are machined.

Having thus described our invention what we claim as new and desire to secure by Letters Patent is:

1. An alternator comprising in combination a casing carrying a stator and associated stator windings, a rotor, means mounting said rotor for rotation relative to said casing, said rotor comprising a pair of parts supporting a field winding, and said pair of parts each having a plurality of fingers, the fingers on the two parts being interdigitated, and each of said fingers extending in a direction which is generally inclined to the axis of said rotor, whereby said fingers draw air through the said casing as the rotor rotates.

2. An alternator as claimed in claim 1 wherein the outer surface of the free end of each finger is formed with a raised portion which is machined to conform to the internal shape of the stator of the alternator.

References Cited

UNITED STATES PATENTS 3,184,625    5/1965    Farison _____ 310—60

FOREIGN PATENTS 690,979    4/1953    Great Britain.

WARREN E. RAY, *Primary Examiner.*

R. SKUDY, *Assistant Examiner.*

U.S. Cl. X.R.
310—61, 263, 269